(12) United States Patent
Aissi

(10) Patent No.: US 7,512,975 B2
(45) Date of Patent: Mar. 31, 2009

(54) HARDWARE-ASSISTED CREDENTIAL VALIDATION

(75) Inventor: Selim Aissi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 851 days.

(21) Appl. No.: 10/222,111

(22) Filed: Aug. 16, 2002

(65) Prior Publication Data

US 2004/0034790 A1 Feb. 19, 2004

(51) Int. Cl.
*H04L 9/32* (2006.01)
*H04L 9/00* (2006.01)

(52) U.S. Cl. .................. 726/19; 713/175; 713/176; 713/182; 713/181; 713/172; 713/173; 713/174; 709/226; 709/229

(58) Field of Classification Search .......... 713/200, 713/176, 156, 181, 172, 173, 174, 175, 189; 726/19

See application file for complete search history.

(56) References Cited

U.S. PATENT DOCUMENTS

| | | | | |
|---|---|---|---|---|
| 5,963,649 | A * | 10/1999 | Sako | 713/168 |
| 6,061,794 | A * | 5/2000 | Angelo et al. | 726/3 |
| 6,185,682 | B1 * | 2/2001 | Tang | 713/168 |
| 6,389,537 | B1 * | 5/2002 | Davis et al. | 713/187 |
| 6,457,066 | B1 * | 9/2002 | Mein et al. | 719/330 |
| 6,714,778 | B2 * | 3/2004 | Nykanen et al. | 455/414.1 |
| 6,912,659 | B2 * | 6/2005 | Labaton | 713/176 |
| 6,978,223 | B2 * | 12/2005 | Milliken | 702/182 |
| 7,016,948 | B1 * | 3/2006 | Yildiz | 709/221 |
| 7,065,340 | B1 * | 6/2006 | Einola et al. | 455/410 |
| 7,103,773 | B2 * | 9/2006 | Erickson et al. | 713/170 |
| 7,146,618 | B1 * | 12/2006 | Mein et al. | 719/330 |
| 2002/0129140 | A1 * | 9/2002 | Peled et al. | 709/224 |
| 2003/0046580 | A1 * | 3/2003 | Taniguchi et al. | 713/200 |
| 2003/0097567 | A1 * | 5/2003 | Terao et al. | 713/176 |
| 2003/0110373 | A1 * | 6/2003 | Champion | 713/153 |
| 2003/0115342 | A1 * | 6/2003 | Lortz | 709/229 |
| 2003/0120925 | A1 * | 6/2003 | Rose et al. | 713/176 |
| 2003/0135628 | A1 * | 7/2003 | Fletcher et al. | 709/229 |
| 2003/0149879 | A1 * | 8/2003 | Tian et al. | 713/176 |
| 2003/0182555 | A1 * | 9/2003 | Labaton | 713/176 |
| 2003/0223584 | A1 * | 12/2003 | Bradley et al. | 380/229 |
| 2004/0006741 | A1 * | 1/2004 | Radja et al. | 715/513 |

(Continued)

FOREIGN PATENT DOCUMENTS

EP 0 717 337 A1 6/1996

(Continued)

OTHER PUBLICATIONS

Allen Brown et al. SOAP Security Extensions: Digital Signature, Feb. 6, 2001, XP-002263657 pp. 1-8.*

(Continued)

*Primary Examiner*—Nasser G Moazzami
*Assistant Examiner*—Eleni A Shiferaw
(74) *Attorney, Agent, or Firm*—Marger Johnson & McCollom

(57) ABSTRACT

A system and method to validate security credentials using hardware is provided. The system includes a credential validation module to recalculate security credentials received in a datagram and to determine if the security credentials are valid. The system also includes a parser to extract the security credentials from the payload data of the received datagram, and a memory to store validated credentials for further use.

16 Claims, 3 Drawing Sheets

U.S. PATENT DOCUMENTS

| | | | |
|---|---|---|---|
| 2004/0015695 A1* | 1/2004 | de Queiroz | 713/176 |
| 2004/0095384 A1* | 5/2004 | Avni et al. | 345/745 |
| 2005/0123167 A1* | 6/2005 | Maeno et al. | 382/100 |
| 2005/0129268 A1* | 6/2005 | Maeno et al. | 382/100 |
| 2006/0277458 A9* | 12/2006 | Layman | 715/513 |

FOREIGN PATENT DOCUMENTS

| | | |
|---|---|---|
| WO | WO 01/63385 A1 | 8/2001 |

OTHER PUBLICATIONS

Don Box et al. "Simple Object Access Protol (SOAP) 101", May 2000, pp. 1-25.*

"SOAP Security Extensions: Digital Signature" Brown, Allen et al., W3C Note Feb. 6, 2001, http://www.w3.org/TR/SOAP-dsig/ (3 pages).

Simple Object Access Protocol (SOAP) 1.1, Don Box, et al., W3C Note May 8, 2000, http://www.w3.org/TR/2000/NOTE-SOAP-20000508 (14 pages).

* cited by examiner

HARDWARE-ASSISTED CREDENTIAL VALIDATION

BACKGROUND

The explosion in web-based services has led to an increased need for security, especially in financial transactions. An interaction between a vendor and a financial institution across a network offers opportunities for malicious interference from hackers, such as 'spoofing' or outright identity theft, as examples.

When a user purchases a product from a vendor, the user sends sensitive financial information to the vendor. The vendor then validates the financial information with the financial institution and accepts the user's order, as an example. During this transaction, the user's financial information may be transmitted through several network links. Hackers may intercept this information, or a hacker may assume an involved entity's identity and either misappropriate the information or attempt to enter some of the other involved entity's sites. These are just examples of some problems that may occur during a transaction with which most users would be familiar, but demonstrate the problems inherent in such a transaction.

Typically, however, there are many transactions or transfers of information that may occur across the Internet or similar networks that do not involve consumers' information directly. Financial institutions may transfer information back and forth, producers and their suppliers may transfer order information, purchase order specifics, etc. All of these transactions need to be secure, or these entities become vulnerable to attack.

In addition to the growing number of transactions involving confidential information, there is a movement towards interoperability. Currently, there are several different kinds of devices that use the Internet to communicate. True interoperability would allow these different platforms to access services, objects and servers in a platform-independent manner. For example, the Simple Object Access Protocol (SOAP) is a protocol that acts as the glue between heterogeneous software components. It offers a mechanism for bridging competing technologies in a standard way. The main goal of SOAP is to facilitate interoperability. However, the increase in interoperability may lead to even easier spoofing and misappropriation of partners' identities in network transactions.

In response to these types of problems, many entities such as vendors and banks have instituted security procedures. For example, the HyperText Transfer Protocol (HTTP) has authentication measures such as the secure socket layer (SSL) which can be used by most web browsers to employ a key to encrypt and decrypt information transmitted over the Internet (or any Network) between partners in a secure transaction. Other examples include the use of symmetric keys, asymmetric keys, session keys, tokens or other types of security credentials.

An initiating partner sends its security credentials to a receiving partner. The receiving partner then checks any incoming messages with the security credentials to ensure that each message it receives from the sending partner has credentials that match. Credentials may include a certificate, a token or a signature. Currently, these credentials are implemented and verified in software. This is not very efficient and may still be subjected to manipulation. For example, keys stored in a file system are typically managed by software applications. During the processing of the software application, the keys may be exposed. Similarly, if the keys are stored in a database, they may be exposed after they are stored.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
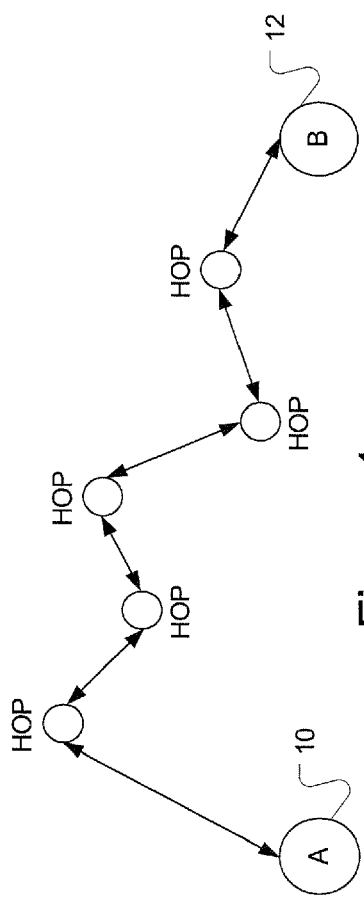
FIG. 1 shows a network over which a transaction may occur.

FIG. 1 shows an environment in which services are provided and transactions executed between two partners in an electronic commerce environment. In this example, Partner A 10 has confidential information related to transactions occurring on its web site, such as an on-line ordering system. Partner B 12 is a supplier of Partner A from which Partner A wishes to purchase parts in order to manufacture goods to fill the orders received from its site. Partner A will transmit a purchase order to Partner B.

The purchase order may have sensitive information in it such as the financial institutions involved, legal documents, credit information, competitive pricing, account numbers and routing information that allows Partner B to confirm the purchase order. Competitive information, such as the number of units and pricing of a specific part could also be transmitted that would allow competitors to gain unfair advantage of either Partner A or Partner B.

Currently, the data transmitted from Partner A to Partner B would more than likely be transmitted across the Internet. However, while the Internet will be used here as an example, it is not intended that application or scope of the invention be limited in any way. The network could be any distributed network in which data transmitted from one endpoint to another may make intervening hops. Similarly, the transmitted data could take many forms other than packets in an Internet Protocol (IP) network. For that reason, the discrete pieces of data transmitted will be referred to as datagrams.

As shown in FIG. 1, Partner A's transmission makes 5 intervening hops between endpoint 10 and endpoint 12. For example, a hop could include a hop to an intermediate server at a financial organization, a desktop in a credit services bureau, or some third-party supplier to Partner A. Any one of these hops could be a point of attack for a hacker to assume the other partner's identity. For example, an attacker could assume Partner B's identity and garner sensitive financial data on Partner A that could be manipulated. Alternatively, an attacker could assume Partner A's identity and garner information about Partner B, or even steal the parts being order by causing Partner B, who assumes that Partner A is really Partner A, to ship parts to the attacker instead of the actual Partner A.

Figure 2:
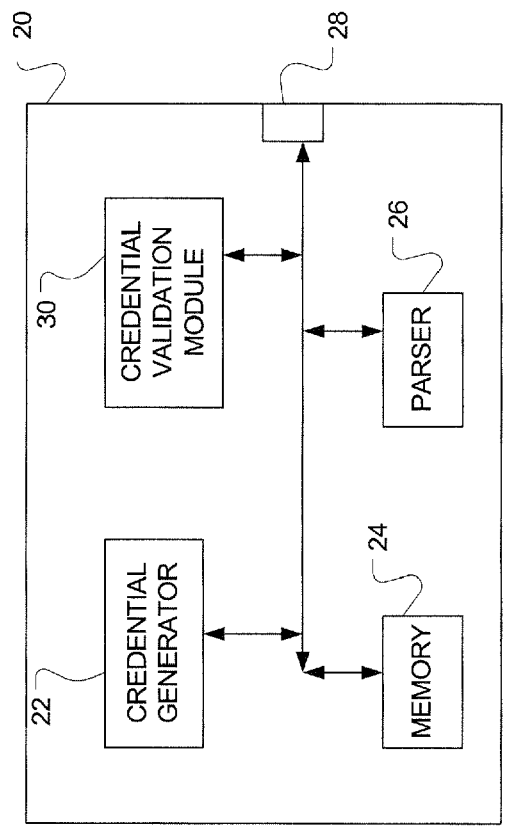
FIG. 2 shows an embodiment of a system with credential validation.

Current implementations of security protocols institute software processes at either end to confirm that the other partner is really the other partner. Software is inherently vulnerable to being 'fooled' or spoofed, as well as requiring often unacceptable system overhead to process the security credentials of the other party. If an attacker knows how a particular software package used for security validates credentials, that hacker could figure out ways to steal or recreate security credentials. FIG. 2 shows an embodiment of a system in which security credentials are validated by the hardware, rather than by a software process.

The system 20 of FIG. 2 includes a security credential validation module 30. In this particular system embodiment, the system includes a credential generator 22, a memory 24, a parser 26, and a port 28. This is just one example of a system configuration and the additional components are optional. Indeed, in many systems the credential generator 22 would reside separate from the credential validation module 30.

Using this system embodiment, however, it is possible to see how a networked device can employ security measures to mitigate the likelihood of attacks. For outgoing data transmissions, the credential generator 22 generates security credentials. As used here, security credentials include public-private encryption key pairs, tokens, digital signatures or any other type of credential that can be used to verify the identify of the transmitting entity. The memory 24 may store credentials generated to allow the system 20 to include the credentials in outgoing data transmissions. These data transmissions would be sent out through port 28.

Port 28 also allows the system 20 to receive datagrams. The security credentials in these datagrams would then be verified and validated by the credential validation module 30. For example, a transmission may include a public key from a partner. The security validation module would then operate on the public key to ensure that the public key transmitted with the data matches the public key previously received from that partner. This allows the receiving party to determine that it is dealing with the right partner, not an impostor.

As part of receiving the datagram through port 28, a parser may extract the security credentials from the datagram payload data. As used here, payload data refers to the data contained inside the datagram that does not include information in the datagram necessary for transmission and management of the datagram, such as the header. The parser may not be required, however, as the credentials may be received in such a format that they do not require extraction, or the credential validation module may have the capability of extracting the credentials without need for a parser.

Figures 3, 4:
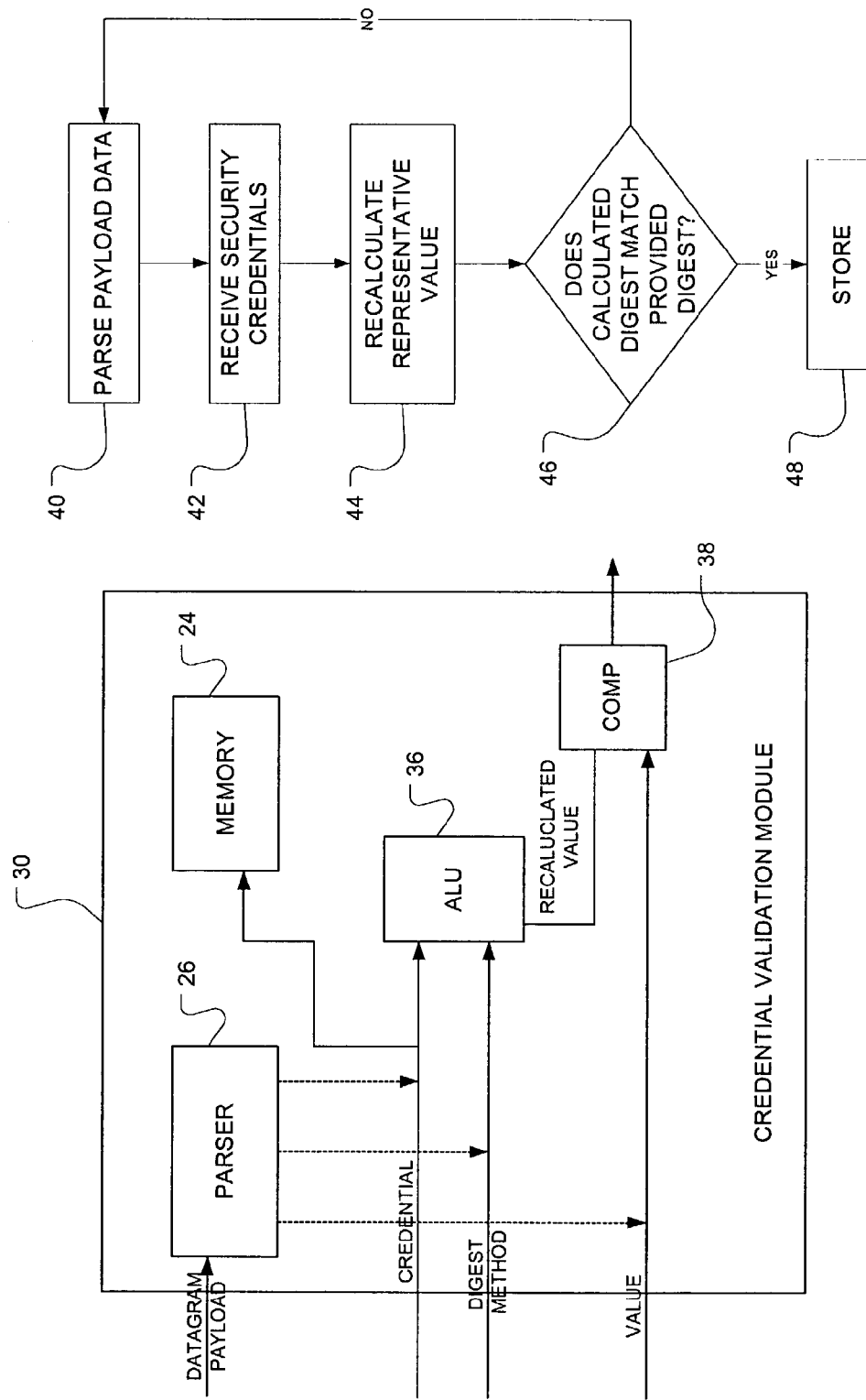
FIG. 3 shows an embodiment of a credential validation module.
FIG. 4 shows a flowchart of an embodiment of a method to validate security credentials.

This is shown in more detail in an embodiment of the invention shown in FIG. 3. In this embodiment either the parser 26 provides an arithmetic logic unit (ALU) 36 with specific information about the security credentials, or the ALU receives it directly, as mentioned above. In this embodiment, the security credentials have at least three parts. The first part is the actual credential. The second is the method that was used to generate the credential. This may include an arithmetic algorithm executed to obtain the credential. The third part is the value of the credential.

In this particular embodiment, the ALU 36 uses the digest method provided to recalculate the credential value by operating on the credential. The comparator 38 then compares the recalculated result with the original value and determines if the credential is valid. The use of an ALU and a comparator are merely examples of hardware components that could perform this process and is not intended to limit the scope of the possible embodiments of the invention in any way.

In this manner, the security credentials are validated in the hardware of the system, leaving them a little less vulnerable than software validation, and speeding the process of validation by moving it into hardware.

An embodiment of a process of performing such a validation is shown in FIG. 4. An incoming datagram with associated security credentials is optionally parsed at 40. At 42, the actual security credentials are received. As mentioned previously, the validation module may not require the credentials to be parsed. At 44, the digest of the security credentials is recalculated. A digest or a 'hash' is a representation of the security credentials resulting from series of operations performed on it, where the series of operations are the digesting method or algorithm mentioned above.

At 46, the recalculated representation or digest is compared to the provided representation or digest. If the two values compare, the security credentials are valid and the data can be trusted as being from where it appears to originate. Also, if the security credentials are valid, they may be stored at 48. Having a stored credential to be checked against incoming credentials allows the process to shorten to just a comparison of the previous received credential and a recently received credential to determine if the data is still trustworthy. However, as noted above, storing the credential is optional. Storing the credentials in hardware, rather than in a file system or database, may increase security.

Figure 5:
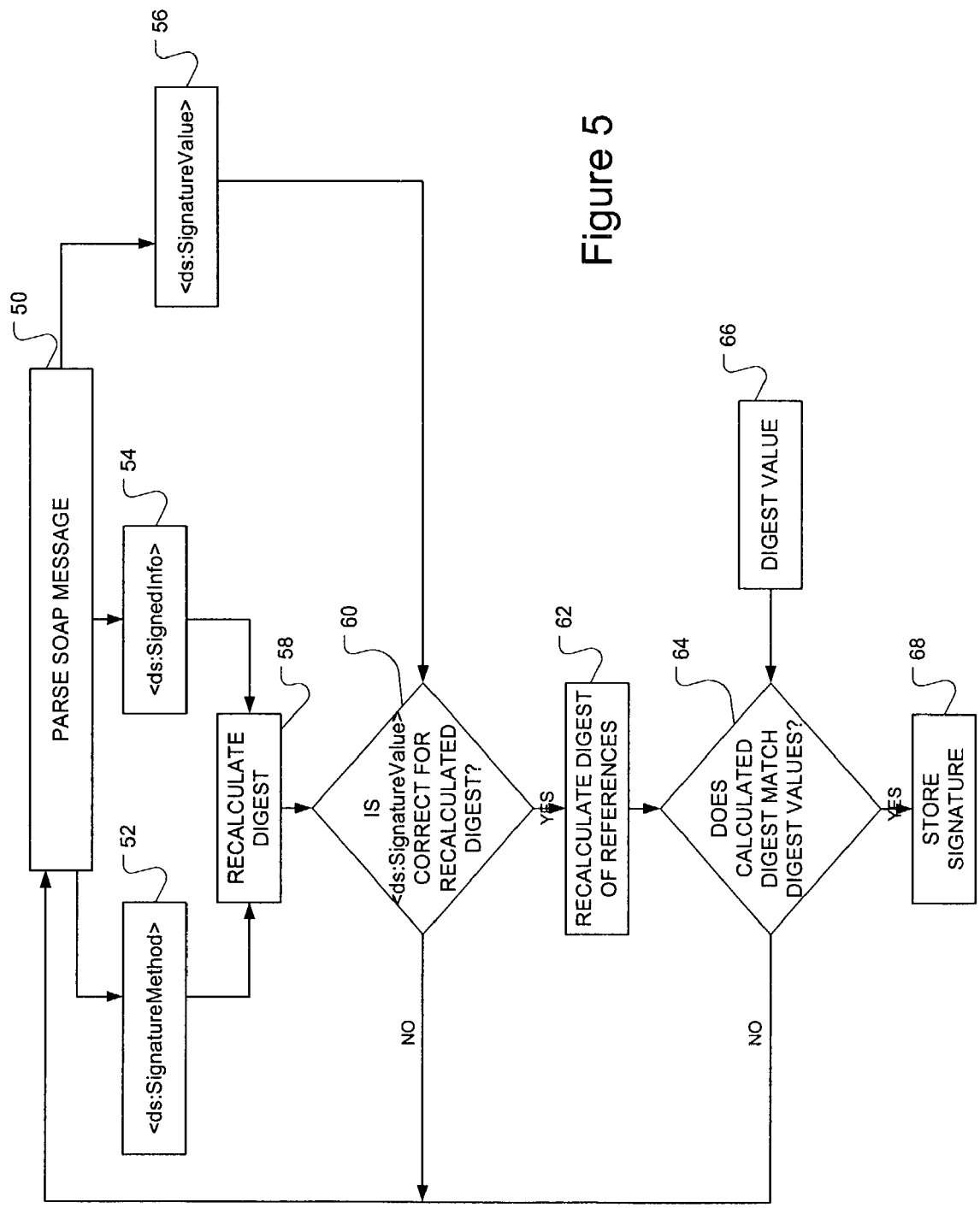
FIG. 5 shows a flowchart of an embodiment of a method to validate digital signatures using the Simple Object Access Protocol.

A specific application of this type of credential validation may be discussed in terms of the Simple Object Access Protocol (SOAP). The payload of a SOAP message includes several elements that represent security credentials. An embodiment of a process to validate security credentials in hardware for a SOAP payload is shown in FIG. 5.

At 50, the SOAP payload is parsed, producing three elements of the SOAP signature: SignatureMethod, SignedInfo, and SignatureValue. SignedInfo 54 is the information that is actually being signed by the digital signature. This is typically canonicalized, meaning transformed into a well-defined, standard format, with a method that is shown in the element CanonicalizationMethod, shown below in the example of a SOAP payload. The SignatureMethod element 52 is the method that is used to convert the canonicalized SignedInfo into the SignatureValue 54.

The process then uses the SignatureMethod and the SignedInfo to recalculate the digest at 58 and compares the resulting signature value from that recalculation to the provided SignatureValue 56, at 60. If this passes, the process moves forward. If the calculated SignatureValue does not correctly compare to the SignatureValue that was provided, the process fails and the digital signature is presumed to be invalid. If the SignatureValue is correct, the process recalculates the digest of the references contained in a Reference element at 62. Each Reference element includes the digest method and resulting digest value calculated over the identified data object. A data object is signed by computing its digest value and a signature over that value. The signature is later checked via reference and signature validation.

At 64, the recalculated digest is compared to a provided digest value 66 as a second check on the signature validation. If that match is correct, the signature may be optionally stored at 68 for future comparison in transactions with that partner. If the match is not correct, the signature is assumed to be invalid and the process either returns to validating another signature, as shown, or progresses to handle the invalid signature. Handling of invalid signatures is outside the scope of this disclosure. An example of a SOAP payload with these elements is shown below.

```
<Signature Id="MyFirstSignature"
    xmlns="http://www.w3.org/2000/09/xmldsig#">
    <SignedInfo>
        <CanonicalizationMethod
            Algorithm="http://www.w3.org/TR/2001/
```

-continued

```
        REC-xml-c14n-20010315"/>
    <SignatureMethod
        Algorithm="http://www.w3.org/2000/09/
        xmldsig#dsa-sha1"/>
    <Reference
        URI="http://www.w3.org/TR/2000/
        REC-xhtml1-20000126/">
        <Transforms>
            <Transform
                Algorithm="http://www.w3.org/TR/2001/
                REC-xml-c14n-20010315"/>
        </Transforms>
        <DigestMethod
            Algorithm="http://www.w3.org/2000/09/xmldsig#sha1"/>
        <DigestValue>j6lwx3rvEPO0vKtMup4NbeVu8nk=
        </DigestValue>
    </Reference>
  </SignedInfo>
  <SignatureValue>MC0CFFrVLtRlk=...</SignatureValue>
  <KeyInfo>
    <KeyValue>
      <DSAKeyValue>
          <P>...</P><Q>...</Q><G>...</G><Y>...</Y>
      </DSAKeyValue>
    </KeyValue>
  </KeyInfo>
</Signature>
```

As mentioned above, the required SignedInfo element is the information that is actually signed. Note that the algorithms used in calculating the SignatureValue are also included in the signed information while the SignatureValue element is outside SignedInfo.

The CanonicalizationMethod is the algorithm that is used to canonicalize the SignedInfo element before it is digested as part of the signature operation. Note that this example is not in canonical form. This is an optional process and not required for implementation of embodiments of the invention.

The SignatureMethod is the algorithm that is used to convert the canonicalized SignedInfo into the SignatureValue. It is a combination of a digest algorithm and a key dependent algorithm and possibly other algorithms. The algorithm names are signed to protect against attacks based on substituting a weaker algorithm. To promote application interoperability one may specify a set of signature algorithms that must be implemented, though their use is at the discretion of the signature creator. One may specify additional algorithms as 'recommended' or 'optional' for implementation; the design also permits arbitrary user specified algorithms.

Each Reference element includes the digest method and resulting digest value calculated over the identified data object. It also may include transformations that produced the input to the digest operation. A data object is signed by computing its digest value and a signature over that value. The signature is later checked via reference and signature validation.

KeyInfo indicates the credential to be used to validate the signature. Possible forms for credentials include digital certificates, tokens, key names, and key agreement algorithms and information, as examples. KeyInfo is optional for two reasons. First, the signer may not wish to reveal key information to all document processing parties. Second, the information may be known within the application's context and need not be represented explicitly. Since KeyInfo is outside of SignedInfo, if the signer wishes to bind the keying information to the signature, a Reference can easily identify and include the KeyInfo as part of the signature.

It must be noted that the specifics of the above message are only intended as an example, and that the use of a SOAP payload is also intended as an example to promote better understanding of embodiments of the invention. No limitation on the scope of the claims is intended, nor should any be implied.

Thus, although there has been described to this point a particular embodiment for a method and apparatus for hardware-assisted credential validation, it is not intended that such specific references be considered as limitations upon the scope of this invention except in-so-far as set forth in the following claims.

What is claimed is:

1. A device, comprising:
    a port to receive a single datagram including payload data and security credentials, the security credentials comprising a credential, a method to generate the credential, and a value of the credential, wherein the method to generate the credential comprises an arithmetic algorithm and wherein the security credentials further comprise a digital signature in compliance with the simple object access protocol;
    a hardware credential validation module, comprising:
        an arithmetic logic unit to calculate a recalculated value of the credential using the method to generate the credential; and
        a hardware comparator to compare the recalculated value and the value of the credential to determine if the credential is valid.

2. The device of claim 1, wherein the device further comprises a hardware parser to extract the security credentials from the received single datagram.

3. The device of claim 2, wherein the hardware parser and the hardware credential validation module reside together.

4. The device of claim 1, wherein the device further comprises a memory to store the security credentials that are determined to be valid.

5. The device of claim 1, wherein the security credentials are one of the group comprised of: a token, a digital signature, a cryptographic key, and a digital certificate.

6. A method of validating security credentials, the method comprising:
    receiving a single datagram including payload data and security credentials, wherein the security credentials comprise a credential, a method to generate the credential, and a value of the credential, wherein the method to generate the security credential comprises an arithmetic algorithm;
    using hardware to calculate a recalculated value of the security credential; and
    using a hardware comparator to compare the recalculated value to the value to determine if the security credentials are valid,
    wherein the credential comprises a digital signature in compliance with simple object access protocol.

7. The method of claim 6, wherein the method further comprises parsing the single datagram using a hardware device to obtain the security credentials.

8. The method of claim 6, wherein the method further comprises storing the security credentials in a hardware memory.

9. The method of claim 8, further comprising:
    receiving a subsequent single datagram; and
    determining if security credentials of the subsequent single datagram are valid using hardware to compare security credentials of the subsequent single datagram to the security credentials stored in the hardware memory.

10. The method of claim 6, wherein the method of generating a credential further comprises a digesting method.

11. The method of claim 10, wherein the credential value further comprises a digital signature value in compliance with simple object access protocol.

12. A system, comprising:
a hardware credential generator to provide outgoing security credentials;
a port to allow transmission of outgoing datagrams to other devices and to receive an incoming datagram,
wherein the outgoing datagrams include outgoing payload data and the outgoing security credentials, wherein the incoming datagram includes incoming payload data and incoming security credentials, the incoming security credentials comprising a credential, a method to generate the credential, and a value of the credential, and wherein the security credentials further comprise a digital signature in compliance with the simple object access protocol; and
a hardware credential validation module, comprising:
an arithmetic logic unit to calculate a recalculated value of the credential using the method to generate the credential; and
a hardware comparator to compare the recalculated value and the value of the credential to determine if the credential is valid.

13. The system of claim 12, wherein the outgoing security credentials further comprise one of the group comprised of: public and private key pairs, tokens, digital certificates, and digital signatures.

14. The system of claim 12, wherein the system further comprises a hardware memory operable to store the credential.

15. The system of claim 12, wherein the system further includes a hardware parser to extract the credential from the incoming datagram.

16. The system of claim 12, further comprising a hardware memory operable to store the outgoing security credentials.

* * * * *